(12) United States Patent
Despineux

(10) Patent No.: US 10,343,759 B2
(45) Date of Patent: Jul. 9, 2019

(54) DEVICE FOR SPECIFYING THE DRIVE LEVEL OF AN ELECTRIC DRIVE OF A BOAT

(71) Applicant: Torqeedo GmbH, Gilching (DE)

(72) Inventor: Frank Despineux, Wessling (DE)

(73) Assignee: Torqeedo GmbH, Gilching (DE)

( * ) Notice: Subject to any disclaimer, the term of this patent is extended or adjusted under 35 U.S.C. 154(b) by 0 days.

(21) Appl. No.: 15/811,487

(22) Filed: Nov. 13, 2017

(65) Prior Publication Data
US 2018/0134362 A1    May 17, 2018

(30) Foreign Application Priority Data
Nov. 14, 2016  (DE) .................. 10 2016 121 747

(51) Int. Cl.
*B63H 21/21*    (2006.01)
*B63H 23/08*    (2006.01)

(52) U.S. Cl.
CPC .......... *B63H 21/213* (2013.01); *B63H 23/08* (2013.01); *B63H 2021/216* (2013.01); *Y02T 10/7258* (2013.01)

(58) Field of Classification Search
CPC .............................. B63H 21/213; B63H 23/08
See application file for complete search history.

(56) References Cited

U.S. PATENT DOCUMENTS

| | | | | |
|---|---|---|---|---|
| 4,898,563 A | * | 2/1990 | Torigai ................... | B63H 20/10 440/1 |
| 4,946,411 A | * | 8/1990 | Novey .................... | B63H 21/22 440/84 |
| 5,318,466 A | * | 6/1994 | Nagafusa ............... | B63H 21/22 440/84 |
| 5,352,138 A | * | 10/1994 | Kanno .................. | B63H 21/265 440/1 |
| 5,481,261 A | * | 1/1996 | Kanno .................. | B63H 21/213 114/144 A |
| 5,492,493 A | * | 2/1996 | Ohkita .................. | B63H 21/213 440/86 |

(Continued)

FOREIGN PATENT DOCUMENTS

| | | |
|---|---|---|
| EP | 1 808 371 A2 | 7/2007 |
| EP | 3 006 327 A1 | 4/2016 |

(Continued)

OTHER PUBLICATIONS

European Search Report issued in European counterpart application No. 17201568.7-1015 dated Mar. 16, 2018, with Statement of Relevancy (Eight (8) pages).

(Continued)

*Primary Examiner* — S. Joseph Morano
*Assistant Examiner* — Jovon E Hayes
(74) *Attorney, Agent, or Firm* — Crowell & Moring LLP

(57) ABSTRACT

A device for specifying the power of an electric drive of a boat includes a hand-actuatable drive which can be positioned between a zero setting, in which the electric drive is stationary, and a maximum setting, in which the electric drive is operated at its nominal power. The device also includes a hand-actuatable overload switching device, on actuation of which the electric drive is operated in an overload operation.

16 Claims, 5 Drawing Sheets

(56) References Cited

U.S. PATENT DOCUMENTS

| | | | | |
|---|---|---|---|---|
| 5,603,644 | A * | 2/1997 | Kobayashi | B63H 11/11 440/86 |
| 6,280,269 | B1 * | 8/2001 | Gaynor | B63B 49/00 440/84 |
| 6,511,354 | B1 * | 1/2003 | Gonring | B63H 21/213 440/87 |
| 6,832,940 | B2 * | 12/2004 | Itoi | B63H 21/14 440/1 |
| 7,121,908 | B2 * | 10/2006 | Okuyama | B63H 20/00 440/84 |
| 7,665,381 | B2 * | 2/2010 | Iekura | B63H 21/213 440/84 |
| 8,066,539 | B2 * | 11/2011 | Suzuki | B63H 21/213 440/86 |
| 8,967,117 | B2 * | 3/2015 | Manjunath | F02D 11/04 123/400 |
| 9,828,080 | B1 * | 11/2017 | Belter | B63H 21/213 |
| 9,868,501 | B1 * | 1/2018 | Gable | B63H 21/21 |
| 2003/0188594 | A1 * | 10/2003 | Levin | F16H 59/044 74/473.12 |
| 2018/0134362 | A1 * | 5/2018 | Despineux | B63H 21/213 |
| 2018/0215456 | A1 * | 8/2018 | Ozaki | G05G 5/06 |

FOREIGN PATENT DOCUMENTS

| | | |
|---|---|---|
| JP | 59-102692 A | 6/1984 |
| JP | 2017-13715 A | 1/2017 |
| WO | WO 88/06242 A1 | 8/1988 |

OTHER PUBLICATIONS

German Office Action issued in German counterpart application No. 10 2016 121 747.6 dated Oct. 2, 2017 (Six (6) pages).

\* cited by examiner

DEVICE FOR SPECIFYING THE DRIVE LEVEL OF AN ELECTRIC DRIVE OF A BOAT

CROSS REFERENCE TO RELATED APPLICATIONS

This application claims priority to German Patent Application No. DE 10 2016 121 747.6, filed Nov. 14, 2016, the disclosure of which is expressly incorporated by reference herein.

FIELD OF THE INVENTION

The present invention relates to a device for specifying the drive level of an electric drive of a boat.

BACKGROUND OF THE INVENTION

It is known to drive boats with an electric motor. It is also known to control the drive level of the electric motor by means of a device for specifying the drive level wherein the specification of the drive level is implemented, for example, by means of the specification of the power and/or the torque and/or the rotary speed of the electric motor. In order to specify the drive level by means of the operator, in principle, two different possibilities are known:

With a boat drive constructed as an outboard motor with an electric motor, it is known to specify the drive level of the electric motor by means of a twist grip which is provided on the end of a tiller mounted directly on the outboard motor. The operator of the outboard motor can then specify in a per se known manner with the tiller, both the direction and the drive level of the motor.

It is also known to provide a remote throttle device in which a drive lever is provided spaced from the boat drive to be controlled and with which the drive level of the electric motor can be specified. Typically, the remote throttle lever is arranged on a control stand of the boat so that it can be easily operated by a driver whilst the driver also operates the steering wheel. A remote throttle device is used, in particular, when the motor is inaccessibly installed in the boat—for example, as a built-in motor with a shaft drive, as a built-in motor with a Z-drive, as a built-in motor with a sail drive or as a pod drive arranged substantially outside the boat. A remote throttle device can however also be used for controlling an outboard motor. The drive level of the controlled electric drive is herein typically steplessly settable according to the setting of the drive lever.

For controlling a boat drive, a plurality of remote throttle devices can also be provided, arranged at different positions on the boat—for example, at two different control stands or on the tiller and on a control stand.

Typically, such devices have a base element rigidly connected to the boat and a drive lever operable by hand, which is pivotably articulated on the base element. During the pivot movement about the pivot axis, the drive lever acts upon a drive transducer—for example, in the form of a sensor—by means of which the power electronics of the electric motor can be controlled. Through the positioning of the drive lever, the drive level at which the electric drive is to be operated can accordingly be set by the operator. In a zero setting of the drive lever, the electric drive stands still. Through an actuation of the drive lever by hand from the zero setting, the electric drive is operated at a drive level according to the position of the drive lever.

The drive lever can be moved and positioned in a range that is delimited by the zero setting and a maximum setting in which the electric drive is operated at its maximum drive level. With a correctly configured system and, in particular, a correctly matched propeller, the maximum drive level also accords with the nominal power of the electric drive. The nominal power of the electric drive, also called the continuous nominal power is herein the maximum power that can be output on proper operation without any temporal restriction without impairing the operating life and safety of the electric drive, the power electronics and the battery bank. The aforementioned range between the zero setting and the maximum setting is typically provided for driving the electric drive in forward operation.

In addition, such devices typically have a reverse setting of the drive lever to specify a reverse running of the electric drive. The reverse setting is settable with a movement of the drive lever from the zero setting in the opposite direction from the aforementioned forward operation range. The drive unit, typically a propeller, of the electric drive generates a force according to the setting of the drive lever which acts in the opposite direction from the force generated during forward drive.

It is also known that electric drives can be temporarily operated above their nominal power rating without any damage occurring, which can be caused, for example, by overheating of the electric drive or a battery bank of the electric drive. Through the limitation of the power control of the electric drive of the boat to its nominal power, the maximum acceleration values thereby providable or the maximum thrust thereby providable in the short term are thus limited to the values usable at nominal power, so that the power capacity of the electric drive of the boat cannot be optimally exploited for all situations.

SUMMARY OF THE INVENTION

It is an object of the present invention to provide an improved device for specifying the power of an electric drive of a boat.

The object is achieved with a device for specifying the drive level of an electric drive of a boat having features of embodiments described herein.

A device for specifying the drive level of an electric drive of a boat comprises a hand-actuatable drive lever which can be positioned between a zero setting, in which the electric drive is stationary, and a maximum setting, in which the electric drive is operated at its maximum drive level. A hand-actuatable overload switching device is provided, on actuation of which the electric drive is operated in an overload operation.

In that a hand-actuatable overload switching device is provided, on operation of which the electric drive is operated in an overload operation, by means of the switching by hand as compared with operation at the maximum drive level, the electric drive can provide an increased thrust or a stronger acceleration acting upon the boat. Consequently, the power capacity of the electric drive can thereby be optimally utilized.

The drive level can be realized by means of a rotary speed stipulation pre-set with the drive lever, so that on reaching the pre-set maximum rotary speed in the maximum drive level, the nominal power of the electric motor is also utilized.

If, however due to a non-optimum design of the drive system—for example, with a propeller having too great a pitch—a system-related pre-determined maximum torque of the electric motor is reached before the maximum rotary speed pre-determined by means of the drive lever is achieved, the nominal power in the maximum drive setting pre-determined by the drive lever is not reached. In such a case, the drive level is then pre-determined by the system-related pre-determined maximum torque. A maximum torque of the electric motor is typically pre-determined in the system in order to prevent a thermal overloading of the motor and consequent damage to the motor.

The drive level can also be realized by means of the power setting or torque setting pre-determined through the drive lever.

By means of the switching of the overload switching device, at least one of the existing limitations in the maximum drive level can be cancelled or displaced. For example, an increased rotary speed in relation to the pre-determined maximum rotary speed and/or an increased torque in relation to the pre-determined maximum torque and/or an increased power in relation to the nominal power can be lifted or displaced by switching the overload switching device.

By means of the proposed device, the electric drive can therefore be operated with improved or increased output data. Thereby, firstly a more sporty handling behavior of the boat is enabled. Secondly, an increased safety can be achieved, since in situations in which an increased motor output is advantageous or even necessary, for example, during evasive maneuvers, during an emergency stop, in heavy seas and strong winds and/or strong currents or for passing danger areas, by actuating the overload switching device, additional thrust can be made available.

Preferably, the electric drive is operable in overload operation at a rotary speed and/or a torque and/or a power output of 101% to 150%, preferably 120% to 140%, particularly preferably at 125% to 130% of a maximum rotary speed pre-determined in the maximum drive level and/or a pre-determinable maximum torque and/or a nominal power rating.

In the case of a drive lever actuatable by hand, it can be a remote throttle lever that is spaced apart from the electric drive, or a drive lever on the tiller of an outboard motor.

In a preferred embodiment, the device also has a reverse setting of the drive lever for specifying a reverse running of the electric drive. The reverse setting is settable with a movement of the drive lever from the zero setting in the opposite direction from the aforementioned forward operation range. Preferably, the electric drive is operable with actuation of the overload switching device by hand, including in the reverse setting in an overload operation. In this way, in particular with an emergency stop, the limitations pre-determined in the maximum drive level can be overcome and an increased power of the motor can be called upon in order to bring the boat to a standstill in a shorter distance.

It is further provided that in a preferred further embodiment, the drive lever has a locking device for locking the drive lever in a particular position, preferably in the zero setting. It is thereby ensured that the drive lever is not accidentally moved out of the locked position, preferably the zero setting.

In a further preferred embodiment, the overload switching device is provided by a movement of the drive lever beyond the maximum setting into an overload setting. In this way, the device can have a particularly simple construction since no additional setting devices are needed for setting the overload operation. Furthermore, the operation of the device is configured to be particularly ergonomic and simple. A person operating the device must only move the drive lever, which he already uses for specifying the desired drive level of the electric drive, beyond the maximum setting without additional hand movements or operating steps being necessary. The person operating the device therefore does not need to concentrate excessively on the operation of the device, but can substantially concentrate on the steering of the boat, so that even during overload operation with increased thrust, a safe and attentive guidance of the boat is enabled.

In a further preferred embodiment, the drive lever has a first stop at the maximum setting wherein the drive lever is movable beyond the maximum setting into the overload setting against a pretension. In that the drive lever has a first stop in the maximum setting, a safe positioning of the drive lever is achieved. In other words, it is thereby ensured that in normal or continuous operation the drive lever is not unintentionally moved beyond the maximum setting. The movement of the drive lever is limited by the stop. If the person operating the device moves the drive lever into the maximum setting, the drive lever hits the stop and the movement of the drive lever is therefore initially limited. It is also signaled to the person operating the device haptically and optically that the maximum setting has been reached.

In order to specify the overload operation of the electric drive, the person operating the device then has to move the drive lever by hand against the pretension into the overload setting. Due to the pretension, an at least slightly greater force application is required for this than is necessary for positioning the drive lever as far as the maximum setting. By this means, it is ensured that the person operating the device does not set the overload operation unknowingly.

In order to sustain the overload operation, the drive lever must also be continually held against the pretension in the overload setting by the person operating the device. If the person operating the device releases the drive lever again or reduces the force applied by hand to the drive lever, then due to the pretension, the drive lever is moved back into the maximum setting, so that the electric drive is again operated in the nominal operation.

In order to provide the pretension precisely and lastingly and in order to achieve a simple and robust structure of the device, the drive lever is pretensioned by means of a spring element and/or an elastomer element and/or a hydraulic pressure element and/or a pneumatic pressure element out of the overload setting into the maximum setting.

In a further preferred embodiment, the overload switching device has a separate switch or button that is actuatable by hand for setting the overload operation. By this means, a particularly easy switching of the overload operation can be achieved. For this, the person operating the device has only to actuate the switch or button. Furthermore, it can thus be prevented that the person operating the device, in particular in heavy seas during which the person uses the drive lever at least temporarily, including to maintain his balance, and when holding-on possibly transfers unintentional sudden movements to the drive lever, accidentally switches into overload operation.

In a further preferred embodiment, in order to set the overload operation, both the separate switch and also the movement of the drive lever beyond the maximum setting into the overload setting can be provided. Thus, the person operating the device can freely decide in which way he switches in the overload operation. In a preferred development, the separate switch can be used in general to enable or to prevent the overload operation. In other words, a setting of the switch can be provided such that a setting of the overload operation is permanently prevented, so that even on a movement of the drive lever into the overload setting, the electric motor is not switched into the overload operation. If the switch is in another switch setting, then the setting of the overload operation is in general enabled by a movement of the drive lever into the overload setting. The separate switch therefore acts as an upstream on and off switch for the overload operation.

In order to provide a particularly simple construction of the device and particularly good ergonomics for the person operating the device, in a further preferred embodiment, the separate switch is provided in a structural unit with the drive lever. Preferably, the separate switch is arranged on the drive lever such that the person operating the device can operate the separate switch without releasing the hand from the drive lever and/or substantially changing his hand position on the drive lever.

In a further preferred embodiment, the overload switching device has a limiting unit for temporal limitation of the overload operation of the electric drive. In this way, it can be ensured that the electric drive is operated in overload operation only for as long as this is possible without danger. In other words, through the temporary limitation of the overload operation, it is ensured that the electric drive, the power electronics and the battery bank suffer no damage from the overload operation. Preferably, the limiting unit is provided in an electronic form. Alternatively, it can also be configured at least partially in a mechanical form, for example, in the form of a time switch clock.

Accordingly, in a further preferred embodiment, the limiting unit can be configured such that it switches back from the overload operation into the maximum drive level after a pre-determined switching time and/or on the basis of at least one operating parameter, preferably a temperature value of the electric drive and/or a battery bank of the electric drive. Thus, it can be prevented particularly reliably that damage occurs to the electric drive through the overload operation, for example, due to overheating.

Preferably, at least one sensor is provided on the electric drive which determines an operating parameter. A particularly reliable operation can herein be achieved if a plurality of sensors is provided at different sites or components of the electric drive, for example, in the region of a stator, a rotor, a control or regulating console or circuit board and/or the battery bank.

In a further preferred embodiment, a blocking unit is also provided for temporary blocking of the overload operation. By this means, it can be prevented that the electric drive can be switched immediately into the overload operation again once the limiting unit has switched it back into the maximum drive level, which could lead to an overheating of the electric drive or its components. The blocking unit is herein preferably integrated into the limiting unit. Alternatively, it can also be provided separately therefrom.

Preferably, the blocking unit is configured such that for a pre-determined blocking time and/or on the basis of the at least one operating parameter, preferably a temperature value of the electric drive and/or of the battery bank of the electric drive, it blocks the renewed switching on of the overload operation.

Preferably, switching on again of the overload operation is blocked for at least so long until all the parameters are again below a predetermined threshold value.

In a further preferred embodiment, a trim-tilt switch for setting the position of the electric drive relative to a horizontal pivot axis of the electric drive is arranged on the drive lever. By this means, the position of the electric drive can be adapted according to the position of the boat in the water, so that the drive unit of the electric drive, preferably a propeller or its rotation axis, is positioned substantially horizontally in the water. The thrust generated by the drive unit of the electric drive then contributes substantially completely to the acceleration of the boat in the movement direction. Furthermore, by means of the trim-tilt switch, preferably on non-use or standstill of the boat, the electric drive can be raised out of the water.

In order to achieve a particularly simple and robust structure of the device and to provide good usability, the trim-tilt switch can be configured in the form of a membrane keyboard or a rocker switch.

In a further preferred embodiment, the drive lever is provided in a drive regulating unit together with a graphical display unit for the graphical representation of information. In this way, a compact construction can be provided. Therefore other units that would otherwise need to be provided to present information in the boat can be dispensed with. By means of the graphical display unit, in particular, the speed of the boat, the charging condition of the battery and the expected range of the boat, the motor power being drawn and/or error messages from the power electronics can be displayed.

In a further preferred embodiment, the device can be provided on the electric drive, preferably on a control unit, such as a tiller or a throttle lever, of the electric drive. In this way, a particularly easy driving of the boat is achieved.

In an alternative preferred embodiment, the device is providable spaced from the electric drive, for example, in the form of a remote throttle lever. In particular, if a control device, for example, a steering wheel for steering the direction of the boat is arranged on the boat spaced from the electric drive, then the device can be arranged in the immediate vicinity of the control device, so that both the control and also the drive level specification to the electric drive can take place from a position on the boat.

Other features and advantages will become apparent from the following more detailed description, taken in conjunction with the accompanying drawings, which illustrate, by way of example, the principles of the presently described invention.

DETAILED DESCRIPTION OF THE DRAWINGS

Figure 1:
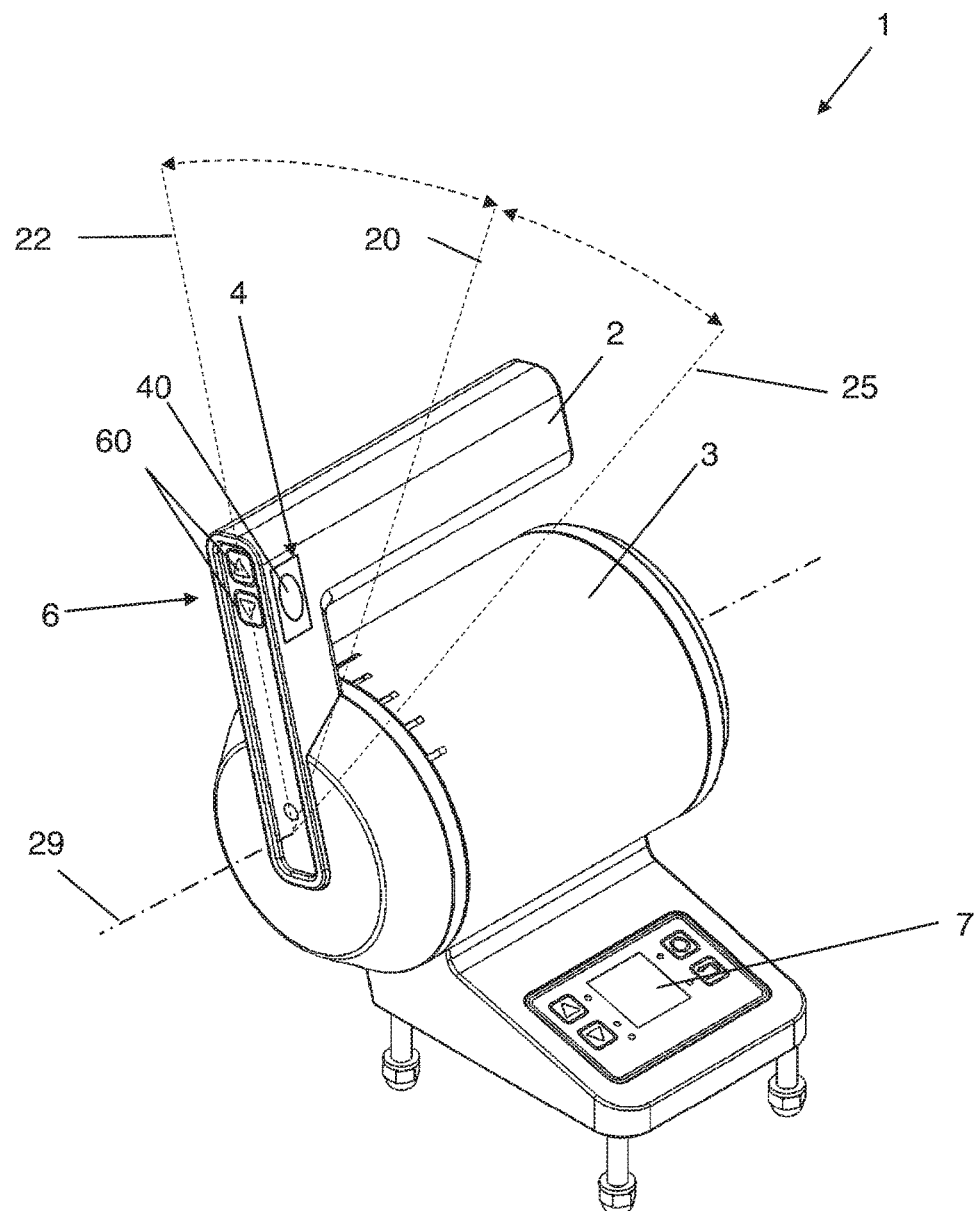
FIG. 1 is a schematic perspective side view of a device for specifying the drive level of an electric drive of a boat.

Exemplary embodiments will now be described with reference to the drawings. Those having ordinary skill in the art may be able to make alterations and modifications to what is described herein without departing from its spirit and scope. While the disclosed invention is susceptible of embodiment in many different forms, there is shown in the drawings and will herein be described in detail at least one preferred embodiment of the invention with the understanding that the present disclosure is to be considered as an exemplification of the principles of the invention and is not intended to limit the broad aspect of the invention to the embodiment illustrated. Therefore, it should be understood that what is illustrated is set forth only for the purposes of example and should not be taken as a limitation on the scope of the present invention. Identical, similar or similarly acting elements in context are provided with the same reference signs in the different drawings, and, for the avoidance of redundancy, the repeated description of these elements is partially dispensed with.

FIG. 1 shows a schematic perspective side view of a device 1 for specifying the drive level of an electric drive 12 of a boat 10. The device 1 comprises a base element 3 connectable to a boat's side (not shown) on which a hand-actuatable drive lever 2 which is arranged pivotable about a pivot axis 29. During the pivot movement about the pivot axis 29, the drive lever 2 acts upon a drive transducer—for example, in the form of a sensor—by means of which the power electronics of the electric motor can be controlled. Through the positioning of the drive lever 2, the drive level at which the electric drive 12 is to be operated can accordingly be specified. The drive level can be specified, for example, by means of a rotary speed specification, a power specification or a torque specification.

In a zero setting 20 of the drive lever 2, the electric drive stands still. Through an actuation of the drive lever 2 by hand from the zero setting 20, the electric drive 12 is operated at a drive level according to the position of the drive lever 2. The drive lever 2 can be moved and positioned in a range that is delimited by the zero setting 20 on one side and a maximum setting 22 in which the electric drive is operated at its maximum drive level in forward operation. In FIG. 1, the drive lever 2 is in the maximum setting 22 and with an optimally configured drive system, the maximum rotary speed, maximum power or nominal power or the pre-determined maximum torque specified by the drive lever 2 in the maximum setting 22 is achieved.

If, however due to a non-optimum design of the drive system—for example, with a propeller having too great a pitch—a system-related maximum torque of the electric motor is reached before a maximum rotary speed specified by means of the drive lever is achieved, the nominal power in the maximum drive level pre-determined by the drive lever is not reached. In such a case, the drive level is then limited by the system-related pre-determined maximum torque. A maximum torque of the electric motor is typically pre-determined in the system in order to prevent a thermal overloading of the motor and consequent damage to the motor.

The drive lever 2 can also be moved out of the zero setting 20 into a reverse setting 25 which, seen from the zero setting 20, is opposite to the maximum setting 22. The electric drive then generates a thrust opposed to the forward operation.

The device 1 shown in FIG. 1 also has an overload switching device 4, on actuation of which the electric drive 12 is operated in an overload operation.

By means of the switching of the overload switching device 4, at least one of the existing limitations existing in the maximum drive level can be displaced. For example, an increased rotary speed relative to the maximum rotary speed pre-determined by the maximum drive level and/or an increased torque relative to the pre-determined maximum torque and/or an increased power in relation to the nominal power can be pre-determined by switching the overload switching device 4.

Preferably, the electric drive is operable in overload operation at a rotary speed, a torque or a power output of 101% to 150%, preferably 120% to 140%, particularly preferably 125% to 130% of a maximum rotary speed pre-determined by the maximum drive level, a pre-determined maximum torque or a nominal power rating.

The electric drive can thereby provide an increased thrust or a stronger acceleration acting upon the boat as compared with operation at the maximum drive level. In order to actuate the overload switching device 4, it has a separate switch 40 actuatable by hand which is provided in a structural unit with the drive lever 2. The overload device 4 can be actuated either in forward operation or in reverse operation.

The overload switching device 4 also has a limiting unit (not shown) in electronic form for temporarily limiting the overload operation of the electric drive 12. The limiting unit or the temporary limitation of the overload operation ensures that the electric drive 12 is operated in overload operation only for as long as this is possible without danger and the electric drive does not suffer damage through the overload operation.

In the embodiment shown in FIG. 1, the limiting unit switches the electric drive after a pre-determined switching time of 30 seconds from the overload operation back into the maximum drive level. It is thereby prevented that damage occurs to the electric drive 12 through the overload operation, for example, due to overheating.

Furthermore, a blocking unit 50 configured together with the limiting unit 5 in a control circuit (not shown) of the device is provided for temporary blocking of the overload operation. The blocking unit prevents that the electric drive can be switched immediately into the overload operation again once the limiting unit has switched it back from the overload operation into the maximum drive level, which could lead to an overheating of the electric drive or its components. In the present instance, following a pre-settable blocking time, the blocking unit 50 unblocks the activation of the overload operation again. In a preferred alternative, the switching into the overload operation is unblocked again only once particular parameters or all parameters are again below a pre-determined threshold. For example, a renewed switching into the overload operation is only unblocked again once the temperature parameters are below a pre-determined value again.

The drive lever 2 also has a trim-tilt switch 6 for setting the position of the electric drive 12 or the drive axis of the propeller relative to the orientation of the boat 10. The trim-tilt switch 6 is arranged laterally on the drive lever 2 in the form of a membrane keyboard with two membrane keys 60. By this means, the position of the electric drive 12 can be adapted according to the position of the boat 10 in the water. A drive unit 12, preferably a propeller 16 of the electric drive 12 or its rotation axis can be positioned horizontally by actuating the membrane keys 60 of the trim-tilt switch 6. The thrust generated by the drive unit of the electric drive 12 thus contributes substantially completely to the acceleration of the boat in the movement direction. Furthermore, by means of the trim-tilt switch 6, during non-use or standstill of the boat 10, the electric drive can be raised out of the water in order to reduce growth or algae deposits and/or to reduce movement resistance when sailing and/or to prevent ground contact when going ashore or travelling in shallow water.

Also provided on the base element 3 is a graphical display unit 7 for the graphical representation of information. By means of the graphical display unit 7, for example, the speed of the boat, the charging condition of the battery and the expected range of the boat, the motor power being drawn and error messages from the power electronics can be displayed. The drive lever 2 and the graphical display unit 7 herein together form a drive regulating unit.

Figure 2:
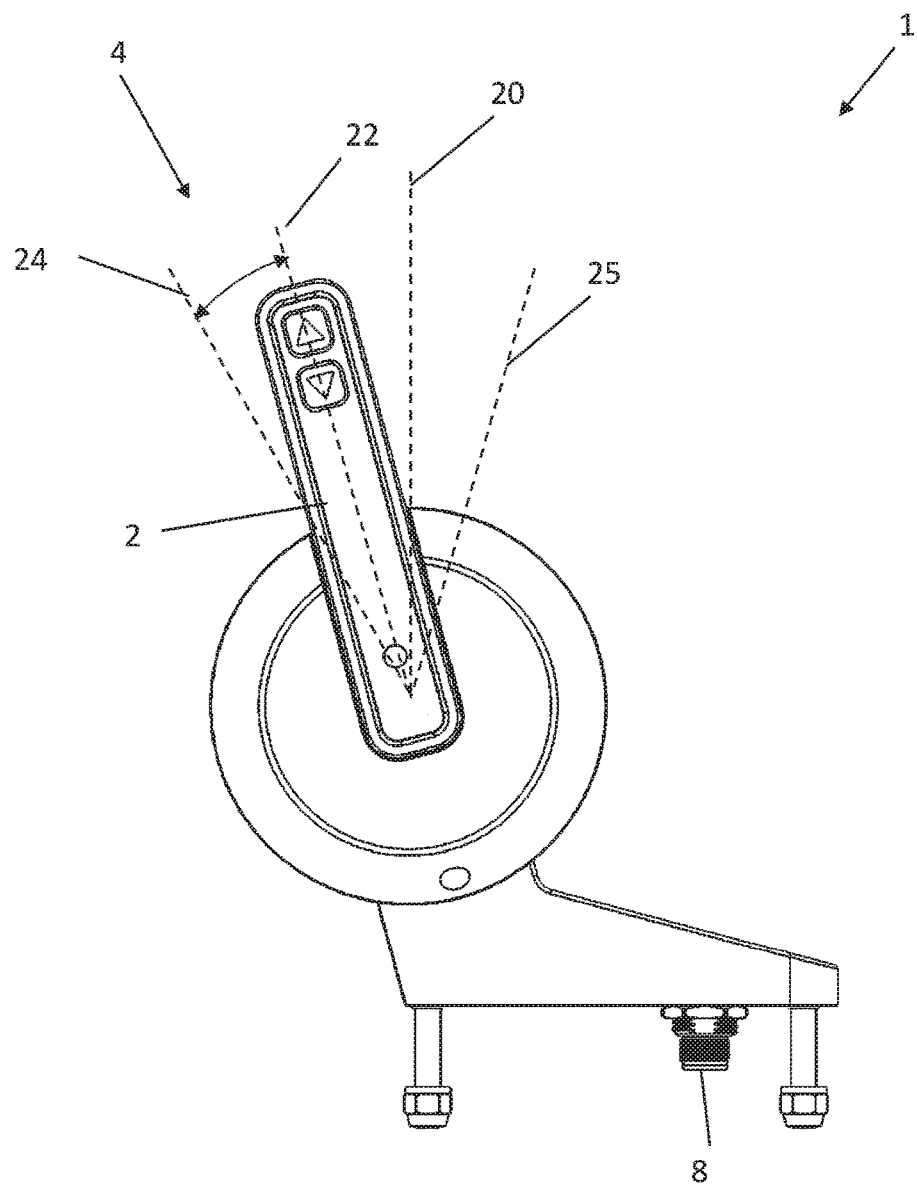
FIG. 2 is a schematic side view of a device for specifying the drive level of an electric drive of a boat in a further embodiment.

FIG. 2 shows schematically a side view of a device 1 for specifying the drive level of an electric drive of a boat in a further embodiment. The device 1 corresponds substantially in its construction to that of FIG. 1. In the device 1 shown in FIG. 2, however, the overload switching device 4 has no separate switch.

Rather, the overload switching device 4 is provided by a movement of the drive lever 2 beyond the maximum setting 22 into an overload setting 24. The drive lever 2 has a first stop (not shown) at the maximum setting 22, wherein the drive lever 2 is movable beyond the maximum setting 22 into the overload setting 24 against a pretension. In order to sustain the overload operation, the drive lever 2 must be held by hand in the overload setting 24 against the pretension. If the drive lever 2 is released, due to the pretension, it is automatically restored to the maximum setting 22, so that the electric drive is operated in the maximum drive level again.

The limiting unit 1 of the device of FIG. 2 switches, on the basis of the value of an operating parameter of the electric drive, for example, a temperature value of the electric motor, out of the overload operation and back again into the maximum drive setting. For this purpose, the limiting unit is linked to a plurality of temperature sensors that are arranged on different components of the electric drive, in this case the battery bank, the stator and the rotor of the electric drive. If one of the temperature values transmitted by the plurality of sensors to the limiting unit exceeds a respective specifically pre-defined limit value for the individual components, the limiting unit switches the overload operation off and switches back into the maximum drive setting.

Furthermore, the blocking unit of the device of FIG. 2 provided in the overload switching device 4 blocks the switching on again of the overload operation on the basis of the temperature values provided by the plurality of sensors. Only when all the temperature values each lie below a value pre-defined for the individual components does the blocking unit release the blocking of the possibility of switching on the overload operation.

The device 2 further comprises a connection 8 by means of which the device 1 can be connected to a control system of the electric drive.

Alternatively, the overload switching device 4 can also have a further pretensioned stop (not shown) in the reverse setting 25 wherein by moving the drive lever 2 beyond the reverse setting 25 into a rearward overload setting, the overload switching device 4 is accordingly also actuatable for the reverse operation. This is helpful, in particular, when initiating an emergency stop maneuver.

Figure 3:
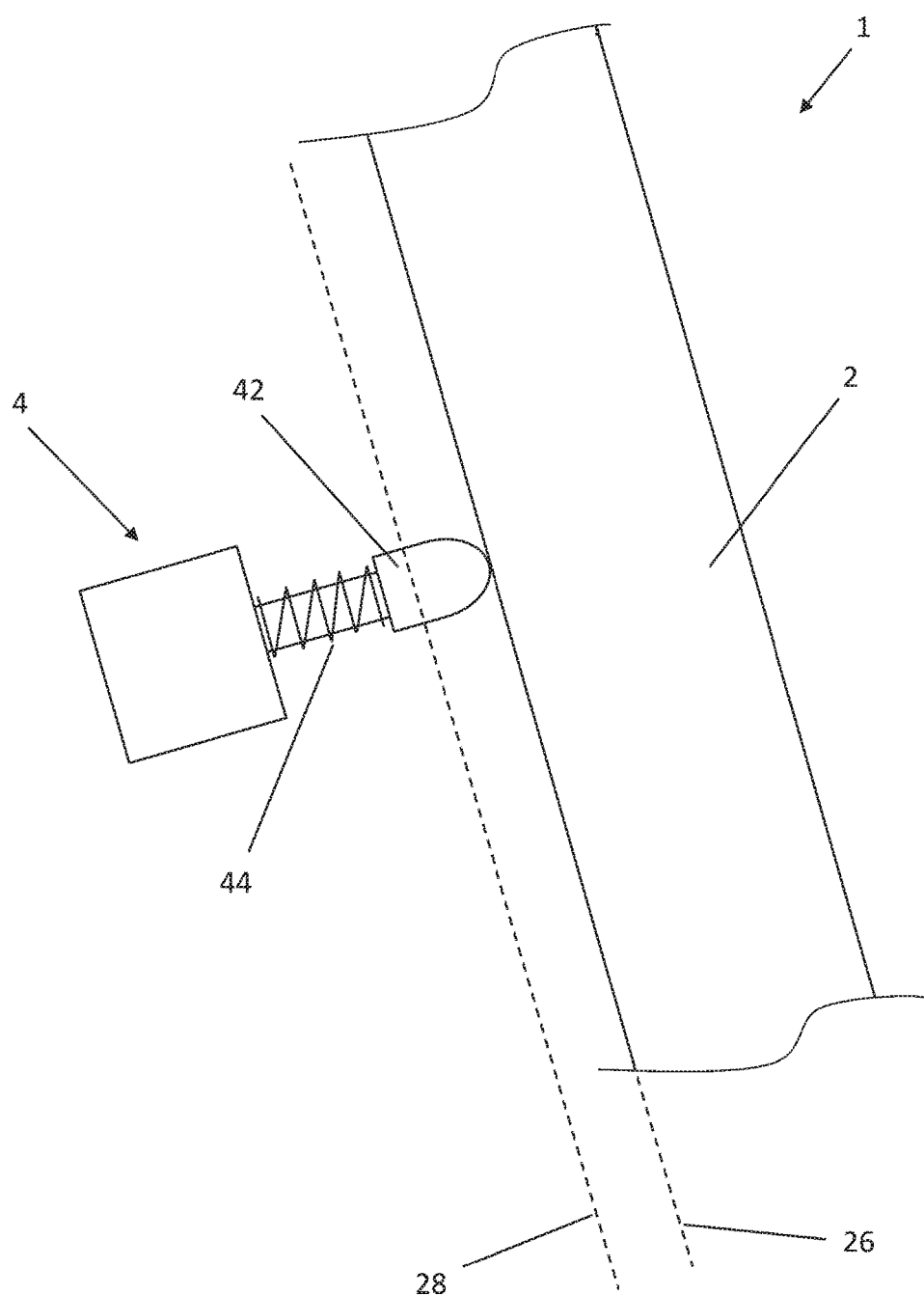
FIG. 3 is a schematic detail view of the device of FIG. 2.
Figure 4:
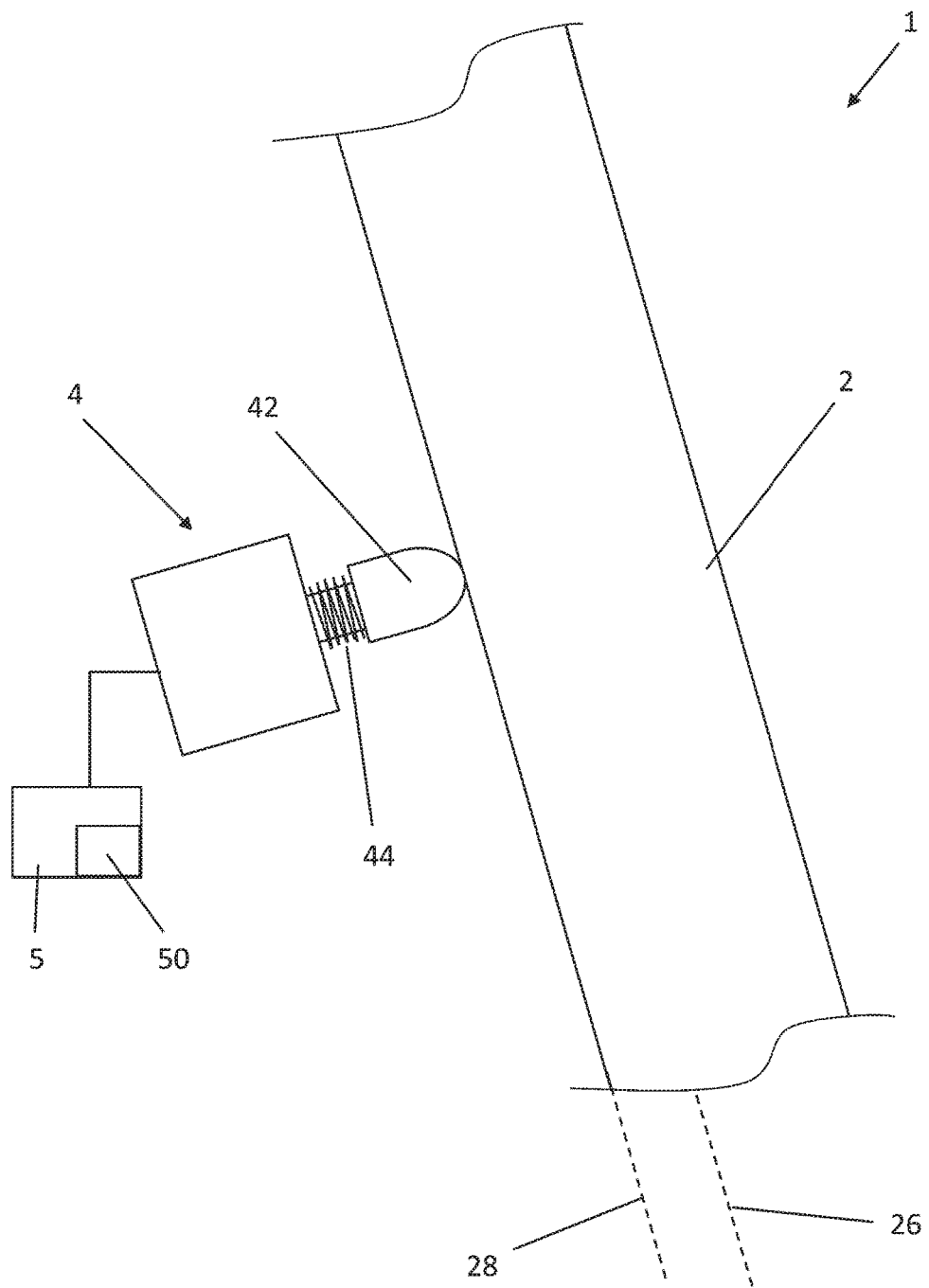
FIG. 4 is a further schematic detail view of the device of FIG. 2.

FIGS. 3 and 4 show schematic detail views of the device of FIG. 2. In FIG. 3, the drive lever 2 is in the maximum setting 22 and lies against a first stop 26. The first stop 26 is herein formed by a stop element 42 pretensioned by at least one pretensioning element 44 which is in operative connection with the overload switching device 4. The stop element 42 is herein in an extended state.

In FIG. 4, the drive lever 2 is in the overload setting 24 and lies against a second stop 28. The second stop 28 is formed by the stop element 42 pressed against the pretension into a retracted position. Through the pressing-in of the stop element 42, the overload switching device 4 is actuated and the electric drive is switched into the overload operation. The electric drive is herein operated in overload operation until either the drive lever 2 is moved out of the overload setting 24 again or the limiting unit 5 of the overload switching device 4 switches the overload operation off and switches into the maximum drive setting. Herein, the setting of the drive lever 2 into the overload setting 24 has no significance. In other words, the limiting unit 5 also switches back into the maximum drive setting when the drive lever 2 is still held in the overload setting 24.

Figure 5:
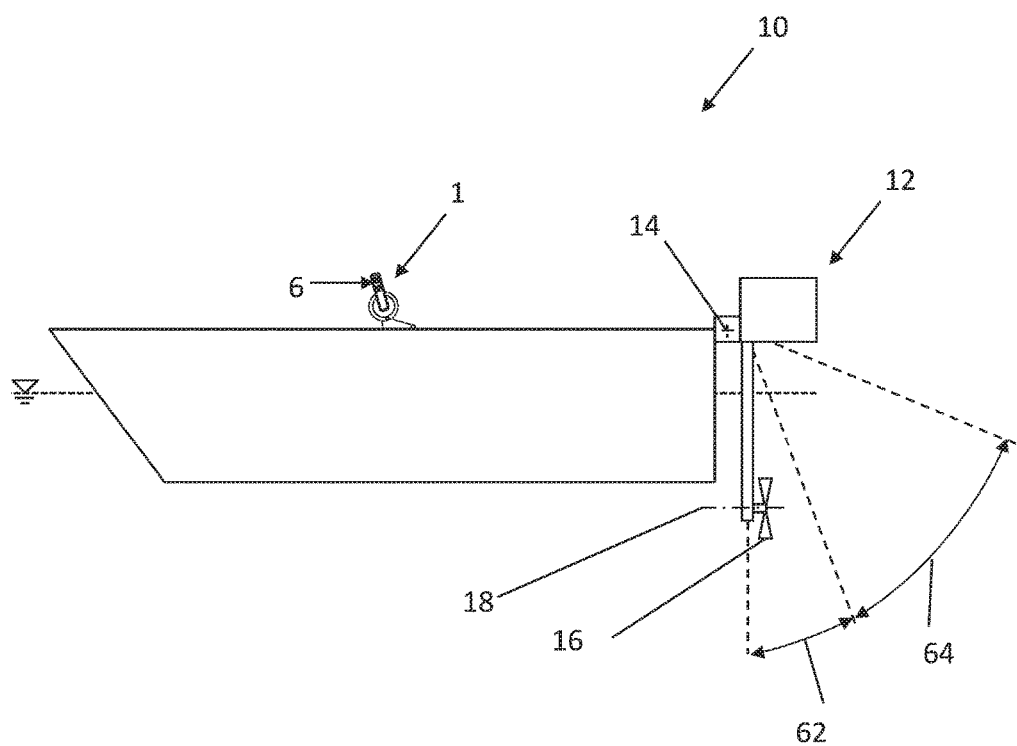
FIG. 5 is a schematic view of a boat with an electric drive and a device for specifying the drive level of the electric drive.

FIG. 5 shows schematically a boat 10 with an electric drive 12, in the form of an electric outboard drive, and a device 1 arranged on the boat 10 spaced from the electric drive 12, for specifying the drive level of the electric drive 12 according to one of the embodiments of FIGS. 1 and 2. The electric drive 12 is pivotably fastened to the boat 10 by means of a horizontal pivot axis 14. The position of the electric drive 12 relative to the horizontal pivot axis 14 can be set by means of the trim-tilt switch 6 of the device 1. Depending upon the orientation of the boat relative to the horizontal, the electric drive can be pivoted in a trim range 62 during operation of the electric drive 12 by actuation of the trim-tilt switch 6, so that a propeller 16 of the electric drive 12 or its propeller axis 18 is positioned substantially horizontally. The thrust generated by the propeller 16 then contributes substantially completely to the acceleration of the boat 10 in the movement direction.

If the electric drive 12 is out of operation or if the drive lever 2 is in the zero setting 22, then the electric drive 12 can be pivoted beyond the trim range 62 into a tilt range 64. By this means, the electric drive 12 can be lifted partially or even completely out of the water into a favorable position for the transport of the boat 10.

As far as practicable, all the individual features which are described in the exemplary embodiments can be combined with one another and/or exchanged without departing from the scope of the invention.

The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The foregoing disclosure has been set forth merely to illustrate the invention and is not intended to be limiting. This disclosure is thus meant to be understood to include what is specifically illustrated and described above, what is conceptually equivalent, what can be obviously substituted, and also what incorporates the essential ideas. Since modifications of the disclosed embodiments incorporating the spirit and substance of the invention may occur to persons skilled in the art, the invention should be construed to include everything within the scope of the appended claims and equivalents thereof.

The scope of this description is indeed to be interpreted in conjunction with the appended claims and the claimed subject matter is what is intended to be patented.

REFERENCE SIGNS

1 Device
10 Boat
12 Electric drive
14 Horizontal pivot axis
16 Propeller
18 Propeller axis 2 Drive lever
20 Zero setting
22 Maximum setting
24 Overload setting
25 Reverse setting
26 First stop
28 Second stop
29 Pivot axis
3 Base element
4 Overload switching device
40 Separate switch
42 Stop element
44 Pretensioning element
5 Limiting unit
50 Blocking unit
6 Trim-tilt switch
60 Membrane keys
62 Trim range
64 Tilt range
7 Graphical display unit
8 Connection

What is claimed is:

1. A device for specifying the drive level of an electric drive of a boat, comprising:
a hand-actuatable drive lever, which can be positioned between a zero setting, in which the electric drive is stationary, and a maximum setting, in which the electric drive is operated at its maximum drive level; and
a hand-actuatable overload switching device, on actuation of which the electric drive is operated in an overload operation,
wherein the overload switching device is actuated by a movement of the drive lever beyond the maximum setting into an overload setting.

2. The device according to claim 1, wherein the drive lever has a first stop at the maximum setting, and the drive lever is movable beyond the maximum setting into the overload setting against a pretension.

3. The device according to claim 1, wherein the drive lever is pretensioned via at least one of: a spring element, a hydraulic pressure element, and a pneumatic pressure element, out of the overload setting into the maximum setting.

4. The device according to claim 2, wherein the drive lever is pretensioned via at least one of: a spring element, a hydraulic pressure element, and a pneumatic pressure element, out of the overload setting into the maximum setting.

5. The device according to claim 1, wherein the overload switching device includes a hand-actuatable separate switch for setting the overload operation.

6. The device according to claim 5, wherein the separate switch and the drive lever comprise a structural unit.

7. The device according to claim 1, wherein the overload switching device includes a limiting unit for the temporal limitation of the overload operation.

8. The device according to claim 7, wherein the limiting unit is configured to switch from the overload operation into the maximum drive level after a pre-determined switching time.

9. The device according to claim 7, wherein the limiting unit is configured to switch from the overload operation into the maximum drive level on the basis of a temperature value of the electric drive and/or a battery bank.

10. The device according to claim 1, further comprising: a trim-tilt switch for setting the position of the electric drive relative to a horizontal pivot axis of the electric drive, wherein the trim-tilt switch is arranged on the drive lever.

11. The device according to claim 10, wherein the trim-tilt switch and the drive lever comprise a structural unit.

12. The device according to claim 10, wherein the trim-tilt switch comprises a membrane keyboard or a rocker switch.

13. The device according to claim 10, wherein the trim-tilt switch comprises a membrane keyboard or a rocker switch.

14. The device according to claim 1, wherein the drive lever is provided in a drive regulating unit together with a graphical display unit for the graphical representation of information.

15. The device according to claim 1, wherein the drive lever and the overload switching device are located on a tiller of the electric drive.

16. The device of claim 1, wherein the drive lever and the overload switching device comprise a remote throttle lever spaced from the electric drive.

* * * * *